(12) United States Patent
Rui (10) Patent No.: US 11,621,627 B2
(45) Date of Patent: Apr. 4, 2023

(54) SWITCHING MODE POWER SUPPLY WITH ZERO VOLTAGE SWITCHING, THE PRIMARY CONTROL CIRCUIT AND THE METHOD THEREOF

(71) Applicant: Lichen Rui, Hangzhou (CN)

(72) Inventor: Lichen Rui, Hangzhou (CN)

( * ) Notice: Subject to any disclaimer, the term of this patent is extended or adjusted under 35 U.S.C. 154(b) by 61 days.

(21) Appl. No.: 17/237,784

(22) Filed: Apr. 22, 2021

(65) Prior Publication Data
US 2021/0336525 A1 Oct. 28, 2021

(51) Int. Cl.
*H02M 1/08* (2006.01)
*H02M 1/00* (2006.01)
*H02M 3/335* (2006.01)

(52) U.S. Cl.
CPC ......... *H02M 1/083* (2013.01); *H02M 1/0058* (2021.05); *H02M 3/33576* (2013.01)

(58) Field of Classification Search
CPC . H02M 1/083; H02M 1/0058; H02M 3/33576
See application file for complete search history.

(56) References Cited

U.S. PATENT DOCUMENTS

| | | | |
|---|---|---|---|
| 8,102,680 B2 | 1/2012 | Ren et al. | |
| 8,238,123 B2 | 8/2012 | Zhang et al. | |
| 8,971,061 B2 | 3/2015 | Li et al. | |
| 9,093,909 B2 | 7/2015 | Wang et al. | |
| 9,397,577 B2 | 7/2016 | Wang et al. | |
| 9,595,885 B2 | 3/2017 | Wang et al. | |
| 2016/0301314 A1* | 10/2016 | Polivka | H02M 3/33507 |
| 2018/0212526 A1* | 7/2018 | Yee | H02M 3/33592 |
| 2018/0358902 A1* | 12/2018 | Duvnjak | H02M 3/33592 |

OTHER PUBLICATIONS

U.S. Appl. No. 14/508,929, filed Oct. 7, 2014, Chengdu Monolithic Power Systems.
U.S. Appl. No. 13/048,660, filed Mar. 15, 2011, Monolithic Power Systems.

* cited by examiner

*Primary Examiner* — Adolf D Berhane
(74) *Attorney, Agent, or Firm* — Nixon Peabody LLP (57) ABSTRACT

A switching mode power supply with zero voltage switching is discussed. It adopts a primary control circuit to turn on a primary switch circuit when a current flowing through the primary switch circuit reaches an inverse current threshold or when a variation rate of a voltage signal indicative of a voltage across the primary switch circuit reaches a rate threshold.

19 Claims, 6 Drawing Sheets

SWITCHING MODE POWER SUPPLY WITH ZERO VOLTAGE SWITCHING, THE PRIMARY CONTROL CIRCUIT AND THE METHOD THEREOF

CROSS-REFERENCE TO RELATED APPLICATIONS

This application claims priority to and the benefit of Chinese Patent Application No. 202010319951.0, filed Apr. 22, 2020, which is incorporated herein by reference in its entirety.

FIELD

The present invention relates to electronic circuits, more specifically, the present invention relates to switching mode power supply, the primary control circuit and the method thereof.

BACKGROUND

As the fast development of the information technology, variable electronic devices are widely used, such as cell phones, portable computers, etc. Such electronic devices typically adopt external adapters (or chargers) to provide power supply. An adapter converts an AC input voltage into a DC output voltage, i.e., an AC input voltage with 50 Hz frequency and 220V rms voltage (or 110V rms/60 Hz) is converted into a low DC voltage (e.g. a 5V DC output) with electrical isolation (i.e. galvanic isolation). A typical topology is a flyback converter. Conventional adapter power supplies sample the output voltage at an output port and feed the sampled voltage back to maintain the output voltage stable. Because of the isolation between the input and the output, electrical (galvanic) isolation is needed for the feedback circuit, e.g., an opto-coupler is usually used. As higher and higher power consumption, the requirement for internal battery capacity is also getting higher and higher. Due to the volume limitation of the electronic device, the battery capacity is also limited. Consequently, fast-charging technology is emerged, which charges the battery fast to counteract the limitation of the battery capacity. And more output power is needed for the adapter with fast-charge technology. How to deliver more output power with same volume (i.e. higher power density) has become a challenge. In order to achieve higher power density, the switching frequency should be increased to reduce the size of the passive components, and the adapter efficiency should be also increased at the same time. Thus, how to increase the efficiency of the converter is a continuous effort needed for the field.

SUMMARY

It is an object of the present invention to provide an improved switching mode power supply, which solves the above problems.

In accomplishing the above and other objects, there has been provided, in accordance with an embodiment of the present invention, a switching mode power supply, comprising: a primary switch circuit, coupled to a primary side of an electrical isolation device, the primary switch circuit being periodically turned on and off, to deliver an input voltage (or input power) into a secondary side of the electrical isolation device; a secondary switch circuit, coupled to a secondary side of the electrical isolation device, the secondary switch circuit being periodically turned on and off, to provide a desired output voltage; a primary control circuit, configured to control the primary switch circuit in response to a current flowing through the primary side or a variation rate of a voltage across the primary switch circuit, so that: during normal operation, when the current flowing through the primary side reaches an inverse current threshold, or when the variation rate of the voltage across the primary switch circuit reaches a rate threshold, the primary switch circuit is turned on; and a secondary control circuit, configured to control the secondary switch circuit to be ON for a period of time before the primary switch circuit is turned on.

In addition, there has been provided, in accordance with an embodiment of the present invention, a primary control circuit used in a switching mode power supply, the switching mode power supply including a primary switch circuit coupled to a primary side of an electrical isolation device, and a secondary switch circuit coupled to a secondary side of the electrical isolation device, the primary control circuit comprising: a primary logical circuit, configured to turn on the primary switch circuit when a current flowing through the primary side reaches an inverse current threshold, or when a variation rate of a voltage across the primary switch circuit reaches a rate threshold during normal operation.

Furthermore, there has been provided, in accordance with an embodiment of the present invention, a method used in a switching mode power supply, the switching mode power supply including a primary switch circuit coupled to a primary side of an electrical isolation device, and a secondary switch circuit coupled to a secondary side of the electrical isolation device, the method comprising: receiving an input voltage at the primary side, and generating an output voltage at the secondary side by controlling the primary switch circuit and the secondary switch circuit to be ON and OFF; detecting a primary current information or a variation rate information of a voltage across the primary switch circuit during normal operation, and turning on the primary switch circuit when a current flowing through the primary side reaches an inverse current threshold, or when the variation rate of the voltage across the primary switch circuit reaches a rate threshold; and generating a frequency control signal according to the output voltage, to control the secondary switch circuit to be ON for a period of time before the primary switch circuit is turned on.

BRIEF DESCRIPTION OF THE DRAWINGS

The use of the similar reference label in different drawings indicates the same of like components.

DETAILED DESCRIPTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
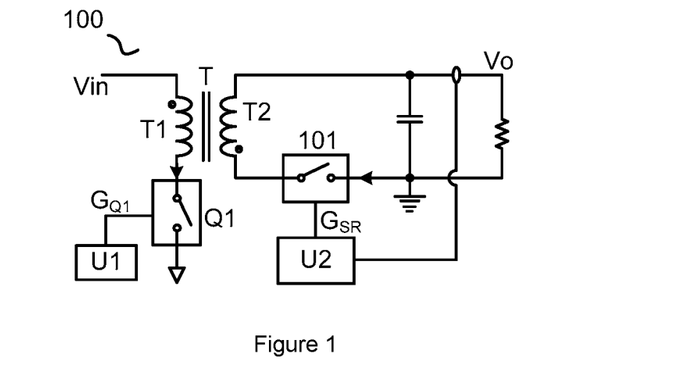
FIG. 1 schematically shows a switching mode power supply 100 in accordance with an embodiment of the present invention.

FIG. 1 schematically shows a switching mode power supply 100 in accordance with an embodiment of the present invention. In the example of FIG. 1, the switching mode power supply comprises: a primary switch circuit Q1, coupled to a primary side T1 of an electrical isolation device T, the primary switch circuit Q1 being periodically turned on and off, to deliver an input voltage Vin into a secondary side T2 of the electrical isolation device T; a secondary switch circuit 101, coupled to the secondary side T2 of the electrical isolation device T, the secondary switch circuit 101 being periodically turned on and off, to provide a desired output voltage $V_O$; a primary control circuit U1, configured to provide a primary control signal $G_{Q1}$, to control the primary switch circuit 101 in response to a current flowing through the primary side or a variation rate of a voltage across the primary switch circuit, so that: when the current flowing through the primary side reaches an inverse current threshold, or when the variation rate of the voltage across the primary switch circuit reaches a rate threshold, the primary switch circuit Q1 is turned on; and a secondary control circuit U2, configured to control the secondary switch circuit 101 to be ON for a period of time before the primary switch circuit Q1 is turned on.

In one embodiment of the present invention, the electrical isolation device T comprises a transformer, having a primary winding and a secondary winding. In one embodiment of the present invention, the electrical isolation device T comprises a piezoelectric transformer.

In one embodiment of the present invention, the primary switch circuit Q1 comprises a power MOSFET having a body diode and a parasitic capacitor. In other embodiments of the present invention, the primary switch circuit Q1 may comprise other switch devices, such as BJT, IGBT, etc.

In one embodiment of the present invention, when the present switching frequency reaches a reference switching frequency (i.e., the present switching cycle reaches a reference switching cycle), a frequency control signal is generated, to control the secondary switch circuit 101 to be ON for a period of time. In one embodiment of the present invention, the switching frequency is related to the output power: higher switching frequency for higher output power, and lower switching frequency for lower output power. In one embodiment of the present invention, the switching frequency is prevented from further decrease when it falls to a certain frequency value (e.g., around 20 kHz).

In one embodiment of the present invention, the secondary switch circuit 101 is controlled to be ON for a period of time when a voltage across the secondary switch circuit 101 reaches a valley threshold, with an ON time length determined by the output voltage $V_O$. For example, the turn-off time point of the secondary switch circuit 101 may be controlled by controlling a peak current flowing through the secondary switch circuit 101 related to the output voltage $V_O$; or the turn-off time point of the secondary switch circuit 101 may be controlled by a constant on time circuit which has a specific relationship with the output voltage $V_O$.

Because the secondary switch circuit 101 has been ON for a period of time when the primary switch circuit Q1 is turned on, the charge at the primary switch circuit Q1's parasitic capacitor is discharged due to the transformer coupling, causing the voltage across the primary switch circuit Q1 to decrease. When the current flowing through the primary side reaches the inverse current threshold, or the variation rate of the voltage across the primary switch circuit Q1 reaches the rated threshold, indicating an ON status of the body diode of the primary switch circuit Q1, the voltage across the primary switch circuit Q1 would fall to be −0.7V or even lower. Then the primary switch circuit Q1 is turned on with zero voltage switching (ZVS). Thus, the switching mode power supply 100 realizes ZVS to the primary switch circuit Q1, which reduces the power loss.

Figure 2:
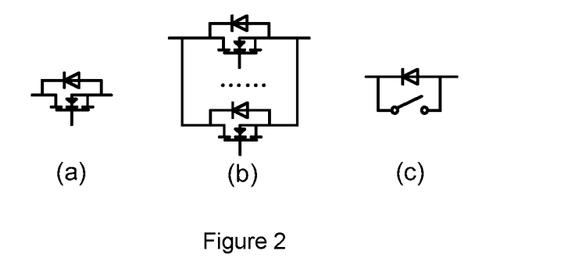
FIG. 2 schematically shows a circuit configuration of the secondary switch circuit 101 in accordance with an embodiment of the present invention.

In one embodiment of the present invention, the secondary switch circuit 101 may comprise a power switch device (e.g. a power MOSFET having a body diode), as shown at the left side (a) of FIG. 2; or the secondary switch circuit 101 may comprise two or more switch devices coupled in parallel, as shown at the middle part (b) of FIG. 2; or the secondary switch circuit 101 may comprise a diode and a switch device coupled in parallel, as shown at the right side (c) of FIG. 2.

In one embodiment of the present invention, the turn-on of the secondary switch circuit 101 means all of the switch devices are turned on or part of the switch devices are turned on (e.g., only the diode or the body diode is ON), and a current flows therethrough. The turn-off of the secondary switch circuit 101 means all of the switch devices are turned off, and no current flows therethrough. For example, when the primary switch circuit Q1 is turned off and the secondary switch circuit 101 freewheels the current, part of the switch devices or all of the switch devices of the secondary switch circuit 101 are turned on, with a first current direction; and after the current freewheeling process ends and before the primary switch circuit Q1's turn-on at the next switching cycle, part of the switch devices or all of the switch devices of the secondary switch circuit 101 are turned on once again for a period of time, with a second current direction.

In one embodiment of the present invention, the secondary switch circuit 101 performs current freewheeling when the primary switch circuit Q1 is turned off or when a current flowing through the primary switch circuit Q1 is detected, until the current freewheeling process is over (i.e., until the current flowing therethrough is zero or approaches zero).

The secondary switch circuit 101 is turned on once again in one switching cycle after the current freewheel process is over and before the primary switch circuit Q1's turn-on at the next switching cycle.

Figure 3:
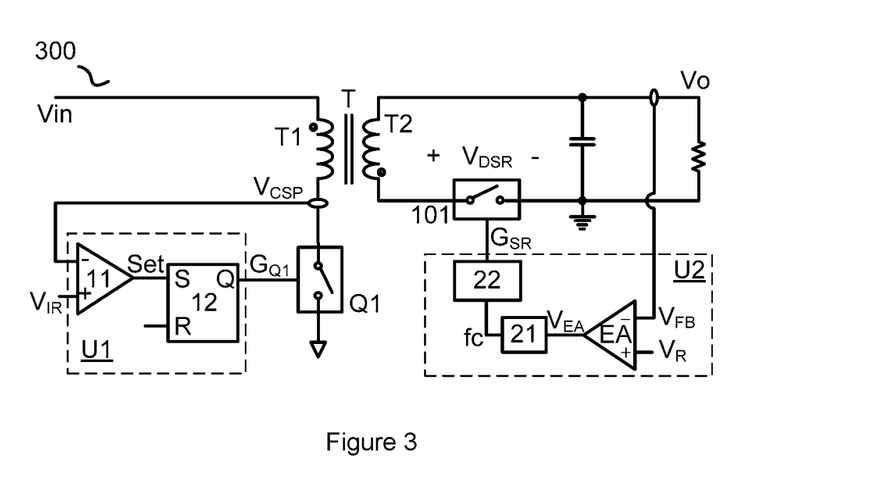
FIG. 3 schematically shows a switching mode power supply 300 with a detailed circuit configuration of the primary control circuit U1 and the secondary control circuit U2 in accordance with an embodiment of the present invention.

FIG. 3 schematically shows a switching mode power supply 300 with a detailed circuit configuration of the primary control circuit U1 and the secondary control circuit U2 in accordance with an embodiment of the present invention. In the example of FIG. 3, the primary control circuit U1 comprises: an inverse current comparator 11, configured to compare a primary sense signal $V_{CSP}$ indicative of the current flowing through the primary side (e.g. the current flowing through the primary switch circuit Q1) with the inverse current threshold $V_{IR}$, to generate a set signal Set; and a primary logical circuit 12, configured to be set in response to a comparison result of the primary sense signal $V_{CSP}$ and the inverse current threshold $V_{IR}$, to turn on the primary switch circuit Q1. The secondary control circuit U2 comprises: a frequency signal generator 21, configured to generate the frequency control signal fc in response to the output voltage (e.g., in response to an error signal $V_{EA}$ indicative of the output voltage $V_O$), to turn on the primary switch circuit 101.

In one embodiment of the present invention, the secondary control circuit U2 further comprises: a time length controller 22, configured to control the ON time length of the secondary switch circuit 101 in response to the frequency control signal fc. In one embodiment of the present invention, the time length controller 22 comprises a monostable circuit. The monostable circuit generates a high-level signal with a fixed time length in response to the frequency control signal, so as to control 101 to be ON for a set time length. In another embodiment of the present invention, the time length controller 22 may control the ON time length of the secondary switch circuit 101 according to the current flowing therethrough. For example, the secondary switch circuit 101 may be turned off when the current flowing therethrough reaches an inverse current limit. In other embodiments of the present invention, the time length controller 22 may control the ON time length of 101 to be related to the output voltage $V_O$: higher output voltage with shorter ON time length, and lower input voltage with longer ON time length.

In the example of FIG. 3, the secondary switch circuit U2 further comprises: an error amplifier EA, configured to amplify and integrate a difference between a reference voltage $V_R$ and a feedback voltage $V_{FB}$ indicative of the output voltage $V_O$, to generate the error signal $V_{EA}$.

Figure 4:
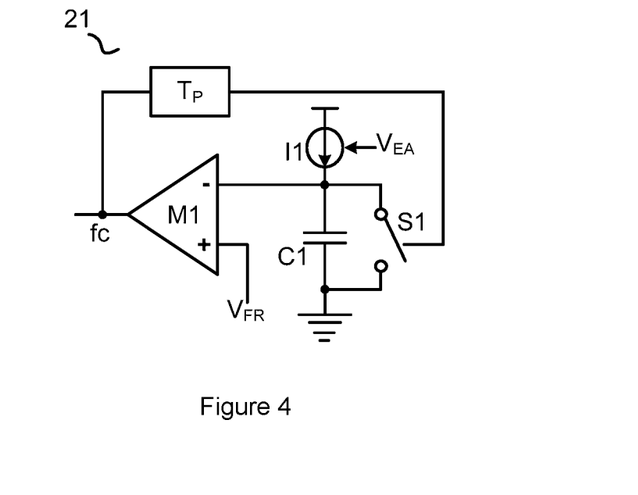
FIG. 4 schematically shows a circuit configuration of the frequency signal generator 21 in accordance with an embodiment of the present invention.

FIG. 4 schematically shows a circuit configuration of the frequency signal generator 21 in accordance with an embodiment of the present invention. In the example of FIG. 4, the frequency signal generator 21 comprises: a controllable current source 11, configured to provide a charge current proportional to the error signal $V_{EA}$; a charge capacitor C1 and a reset switch S1 coupled in parallel, the charge capacitor C1 being charged by the controllable current source 11 when the reset switch S1 is OFF, and a voltage across the charge capacitor C1 being reset to zero when the reset switch S1 is ON; a frequency comparator M1, configured to compare the voltage across the charge capacitor C1 with a frequency reference value $V_{FR}$, to generate the frequency control signal fc; and a short pulse circuit $T_P$, configured to control the ON and OFF of the reset switch S1 in response to the frequency control signal fc. One skilled in the art should realize that the frequency signal generator 21 may not be limited to the embodiment in FIG. 4, but may have many different implementations, e.g., the frequency signal generator 21 may comprise a voltage controlled oscillator.

Figure 5:
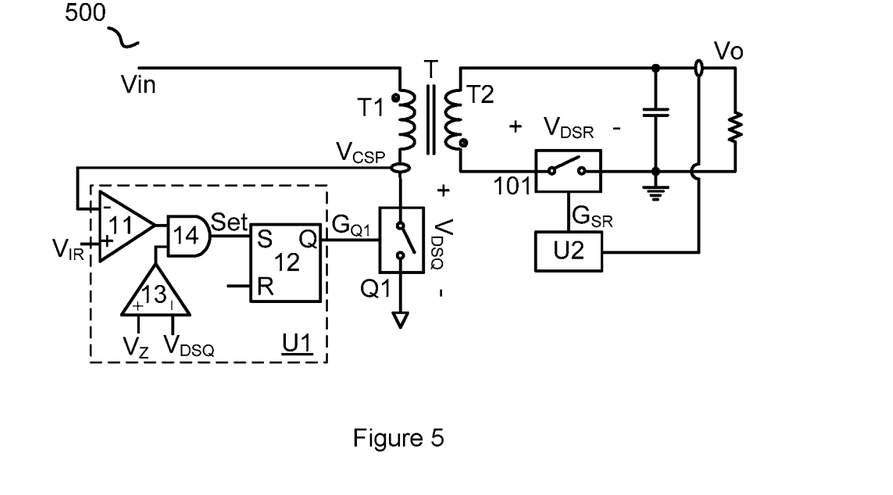
FIG. 5 schematically shows a switching mode power supply 500 with a detailed circuit configuration of the primary control circuit U1 in accordance with an embodiment of the present invention.

FIG. 5 schematically shows a switching mode power supply 500 with a detailed circuit configuration of the primary control circuit U1 in accordance with an embodiment of the present invention. The primary control circuit U1 in FIG. 5 is similar as that in FIG. 3, with a difference that in the example of FIG. 5, the primary control circuit U1 further comprises: a voltage comparator 13, configured to compare the voltage ($V_{DSQ}$) across the primary switch circuit Q1 with a zero reference voltage $V_Z$, wherein when the current flowing through the primary side reaches the inverse current threshold $V_{IR}$ and when the voltage $V_{DSQ}$ across the primary switch circuit Q1 is lower than the zero reference voltage $V_Z$, the primary switch circuit Q1 is turned on. That is, the primary logical circuit 12 is configured to turn on the primary switch circuit Q1 in response to the comparison result of the primary sense signal $V_{CSP}$ and the inverse current threshold $V_{IR}$, and the comparison result of the voltage $V_{DSQ}$ across the primary switch circuit Q1 and the zero reference voltage $V_Z$.

In one embodiment of the present invention, the primary control circuit U1 further comprises: a logical AND circuit 14, configured to perform a logical AND operation on the comparison result of the primary sense signal $V_{CSP}$ and the inverse current threshold $V_{IR}$, and the comparison result of the voltage $V_{DSQ}$ across the primary switch circuit Q1 and the zero reference voltage $V_Z$, to generate the set signal Set.

Figure 6:
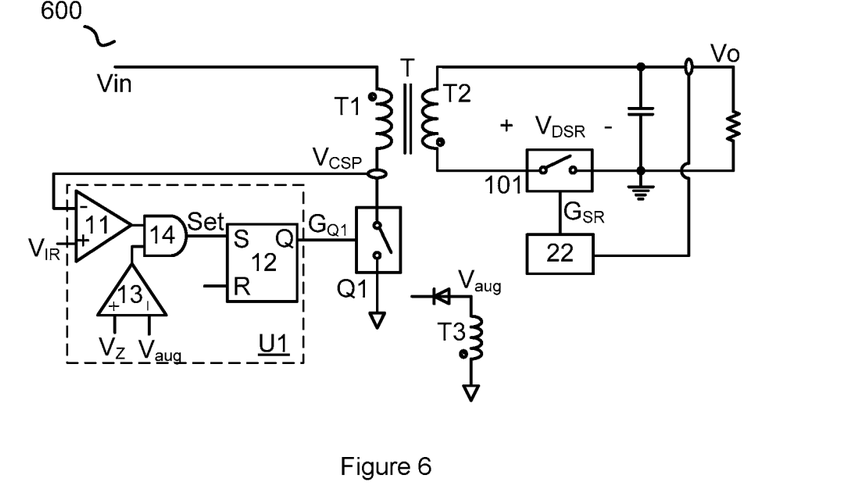
FIGS. 6-10 schematically shows different circuit configurations of the primary control circuit U1 in accordance with embodiments of the present invention.

FIG. 6 schematically shows a switching mode power supply 600 with a detailed circuit configuration of the primary control circuit U1 in accordance with an embodiment of the present invention. The primary control circuit U1 in FIG. 6 is similar as that in FIG. 3, with a difference that in the example of FIG. 6, the switching mode power supply 600 further comprises: a third winding T3, magnetically coupled to the primary side T1 of the electrical isolation device T. The primary control circuit U1 further comprises: a voltage comparator 13, configured to compare a voltage $V_{aug}$ across the third winding T3 with the zero reference voltage $V_Z$; wherein when the current flowing through the primary side reaches the inverse current threshold $V_{IR}$ and when the voltage $V_{aug}$ across the third winding T3 is lower than the zero reference voltage $V_Z$, the primary switch circuit Q1 is turned on. That is, the primary logical circuit 12 is configured to turn on the primary switch circuit Q1 in response to the comparison result of the primary sense signal $V_{CSP}$ and the inverse current threshold $V_{IR}$, and the comparison result of the voltage $V_{aug}$ across the third winding T3 and the zero reference voltage $V_Z$. One skilled in the art should realize that the voltage $V_{aug}$ across the third winding T3 also represents the voltage $V_{DSQ}$ across the primary switch circuit Q1, and the variation rate of $V_{DSQ}$ can also be represented by the variation rate of $V_{aug}$.

In one embodiment of the present invention, the voltage $V_{aug}$ across the third winding T3 is compared with $V_Z$ by way of a resistive voltage divider (not shown), to realize voltage match. In one embodiment of the present invention, the zero reference voltage $V_Z$ may comprise a reference voltage closes to zero, e.g., $V_Z$=100 mV.

Figure 7:
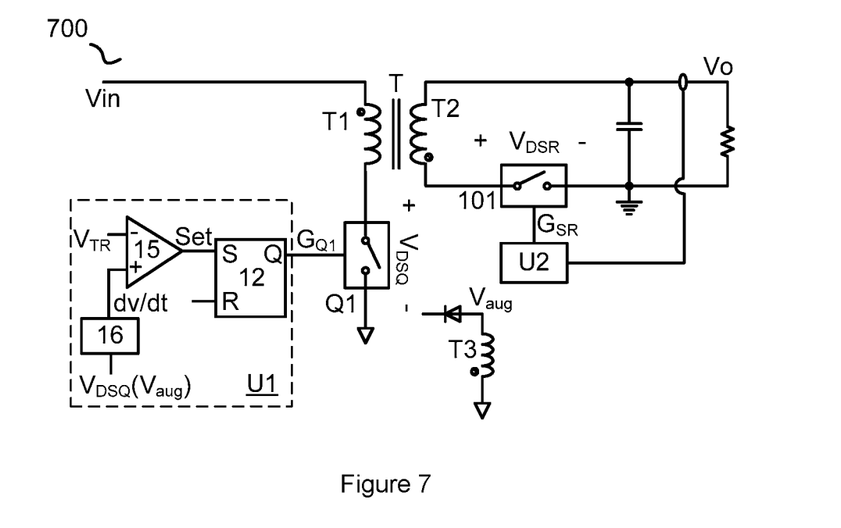

FIG. 7 schematically shows a switching mode power supply 700 with a detailed circuit configuration of the primary control circuit U1 in accordance with an embodiment of the present invention. In the example of FIG. 7, the primary control circuit U1 comprises: a rate comparator 15, configured to compare a differential signal dv/dt indicative of the variation rate of the voltage across the primary switch circuit Q1 with the rate threshold $V_{TR}$, to generate the set signal Set; and a primary logical circuit 12, configured to be set in response to the comparison result of the differential signal dv/dt and the rate threshold $V_{TR}$, to turn on the primary switch circuit Q1.

In the example of FIG. 7 the primary control circuit U1 further comprises: a differential circuit 16, configured to receive the voltage $V_{DSQ}$ across the primary switch circuit Q1 or the voltage $V_{aug}$ across the third winding T3, to generate the differential signal dv/dt.

Figure 8:
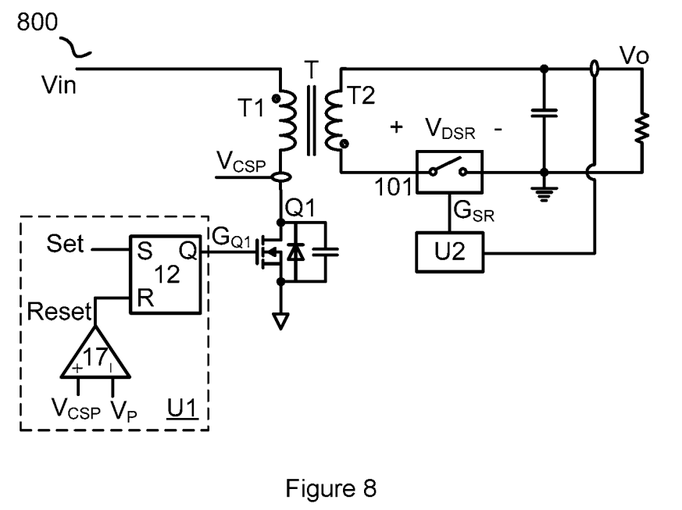

FIG. 8 schematically shows a switching mode power supply 800 with a detailed circuit configuration of the primary control circuit U1 in accordance with an embodiment of the present invention. In the example of FIG. 8, the primary control circuit U1 comprises: a primary logical circuit 12, configured to be set in response to the set signal Set, to turn on the primary switch circuit Q1. In one embodiment of the present invention, the set signal Set may be generated by the way of FIG. 3 or FIG. 5, or FIG. 6, or FIG. 7. The primary control circuit U1 further comprises: a peak current comparator 17, configured to compare the primary sense signal $V_{CSP}$ with a peak value reference $V_P$, to generate the reset signal Reset; wherein the primary logical circuit 12 is reset in response to a comparison result of the primary sense signal $V_{CSP}$ and the peak value reference $V_P$, to turn off the primary switch circuit Q1.

Figure 9:
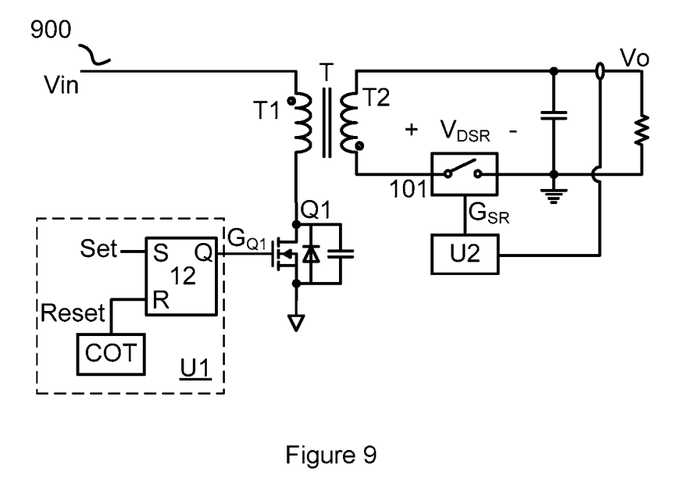

FIG. 9 schematically shows a switching mode power supply 900 with a detailed circuit configuration of the primary control circuit U1 in accordance with an embodiment of the present invention. In the example of FIG. 9, the primary control circuit U1 comprises: a primary logical circuit 12, configured to be set in response to the set signal Set, to turn on the primary switch circuit Q1. In one embodiment of the present invention, the set signal Set may be generated by way of FIG. 3 or FIG. 5, or FIG. 6, or FIG. 7. The primary control circuit U1 further comprises: a constant on time circuit COT, configured to control the ON time length of the primary switch circuit Q1, to generate the reset signal Reset, to turn off the primary switch circuit Q1.

Figure 10:
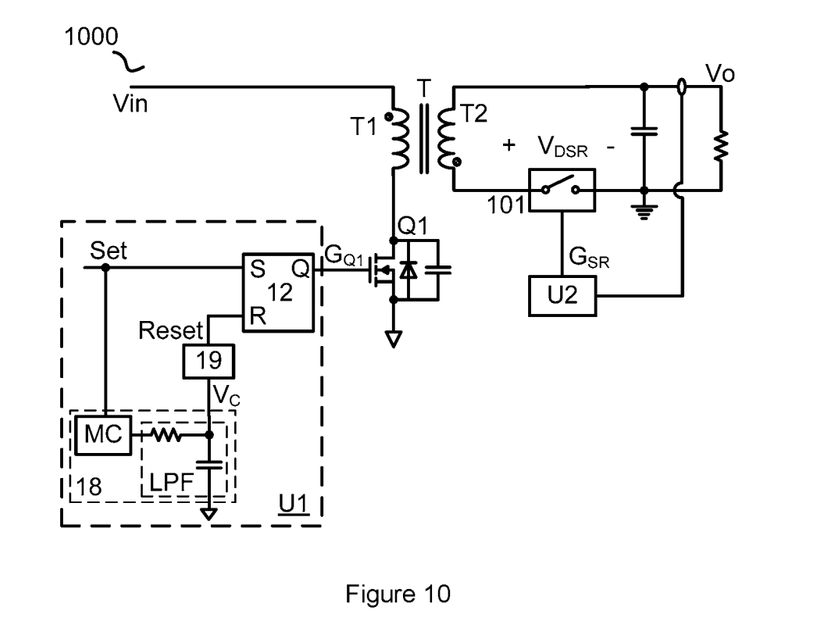

FIG. 10 schematically shows a switching mode power supply 1000 with a detailed circuit configuration of the primary control circuit U1 in accordance with an embodiment of the present invention. In the example of FIG. 10, the primary control circuit U1 comprises: a primary logical circuit 12, configured to be set in response to the set signal Set, to turn on the primary switch circuit Q1. In one embodiment of the present invention, the set signal Set may be generated by way of FIG. 3 or FIG. 5, or FIG. 6, or FIG. 7. The primary control circuit U1 further comprises: a frequency to voltage converter 18, configured to generate a compensation signal $V_C$ in response to a frequency of the set signal Set (i.e., in response to the turn-on frequency of the primary switch circuit Q1), to turn off the primary switch circuit Q1.

In one embodiment of the present invention, the primary control circuit U1 further comprises: an off process circuit 19, configured to receive the compensation signal $V_C$. The off process circuit 19 may control the ON time length of the primary switch circuit Q1 to be related to the compensation signal $V_C$ (as that in FIG. 9) to control the turn-off time point of the primary switch circuit Q1, or the off process circuit 19 may control the peak current value flowing through the primary switch circuit Q1 to be related to the compensation signal $V_C$ (as that in FIG. 8) to control the turn-off time point of the primary switch circuit Q1.

In one embodiment of the present invention, the frequency to voltage converter comprises: a monostable circuit MC, configured to generate the pulse signal in response to the set signal Set (i.e., when the primary switch circuit Q1 is turned on); and a low pass filter LPF, configured to filter the pulse signal to generate the compensation signal $V_C$.

Figure 11:
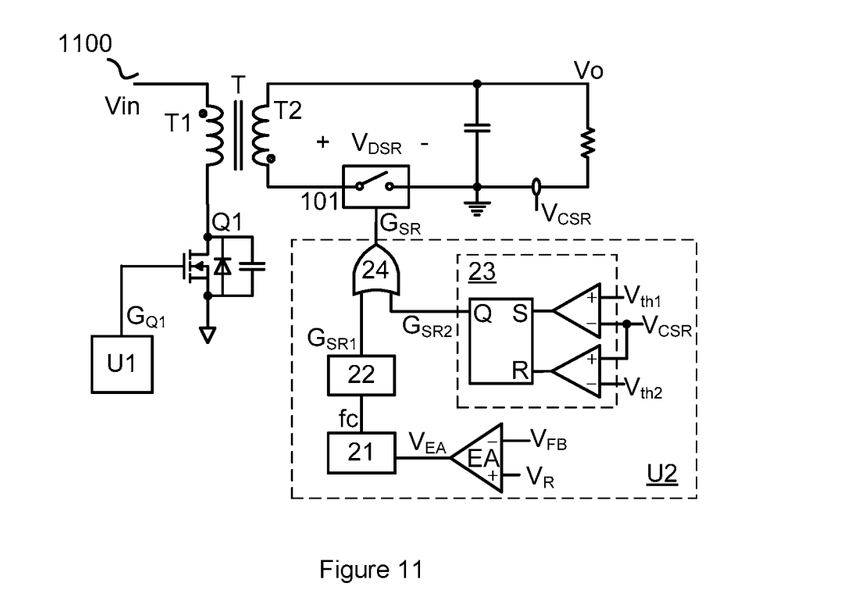
FIG. 11 schematically shows a switching mode power supply 1100 with a detailed circuit configuration of the secondary control circuit U2 in accordance with an embodiment of the present invention.

FIG. 11 schematically shows a switching mode power supply 1100 with a detailed circuit configuration of the secondary control circuit U2 in accordance with an embodiment of the present invention. In the example of FIG. 11, the secondary control circuit U2 comprises: the foregoing frequency generator 21 and the time length controller 22, configured to generate the first control signal $G_{SR1}$, to control the secondary switch circuit 101 to be ON for a period of time before the primary switch circuit Q1's turn-on at the next switching cycle. The secondary control circuit U2 further comprises: a second control signal generator 23, configured to be set in response to a comparison result of a first voltage threshold $V_{th1}$ (e.g. −0.1V) and a secondary sense signal $V_{CSR}$ indicative of the current flowing through the secondary side, and to be reset in response to a comparison result of a second threshold $V_{th2}$ (e.g. −0.01V) and the secondary sense signal $V_{CSR}$, to generate a second control signal $G_{SR2}$, to turn off the secondary switch circuit 101. That is, the second control signal generator 23 is configured to control the secondary switch circuit 101 to freewheel the current in response to the comparison result of the first voltage threshold $V_{th1}$ (e.g. −0.1V) and the secondary sense signal $V_{CSR}$, and the comparison result of a second threshold $V_{th2}$ (e.g. −0.01V) and the secondary sense signal $V_{CSR}$ after the primary switch circuit Q1's turn-off.

In one embodiment of the present invention, the secondary sense signal $V_{CSR}$ may comprise a voltage drop the secondary switch circuit 101. In one embodiment of the present invention, the secondary control circuit U2 further comprises: a logical OR unit 24, configured to perform a logical OR operation on the first control signal $G_{SR1}$ and the second control signal $G_{SR2}$, to generate the secondary control signal $G_{SR}$, to control the secondary switch circuit 101.

During the operations of the several embodiments of the forgoing switching mode power supply, the primary switch circuit Q1 is turned on under the control of the primary control signal $G_{Q1}$ at the beginning of each switching cycle. The current flowing through the primary side T1 of the electrical isolation device T increases linearly, until the primary switch circuit Q1 is turned off. The trig condition of the turn-off is met when the current flowing through the primary side reaches a set value determined by the compensation signal $V_C$ or determined by a reference peak value; or is met when the on time of the primary switch circuit Q1 reaches a set on time length or reaches an on time length determined by the compensation signal $V_C$, etc. Then, the switching mode power supply enters into current freewheeling process. Due to the transformer coupling effect, the body diode of the secondary switch circuit is ON before the turn-on of the secondary switch circuit 101. The current flowing therethrough is detected (e.g., the secondary sense signal $V_{CSR}$ is lower than the first voltage threshold $V_{th1}$), and the secondary switch circuit 101 is turned on by the second control signal $G_{SR2}$. Accordingly, the current flows through the secondary switch circuit 101. Then the voltage $V_{DSR}$ across 101 is proportional to the current flowing therethrough, and increases gradually from a negative value as the current gradually declines. When $V_{DSR}$ increases to be higher than the second voltage threshold $V_{th2}$ (meaning the current flowing through 101 falls to zero), the secondary switch circuit 101 is turned off, and the current freewheeling process is over. The system enters discontinuous current mode or critical current mode.

When a time interval from the start time point of the switching cycle (i.e., from the start time point when the primary switch circuit Q1 is turned on) to the current time point reaches the reference switching cycle, the frequency control signal fc is generated by the frequency signal generator 21. The secondary switch circuit 101 is turned on again, and the current flowing through the secondary switch circuit 101 increases inversely. When the ON time length reaches the time length controlled by the time length controller 22 (e.g., when the inverse current flowing through the secondary switch circuit 101 reaches the inverse current limit, or the ON time length reaches the set time length), the secondary switch circuit 101 is turned off. Then, due to the transformer coupling effect, the inverse current is transferred to the primary side, which discharges the parasitic capacitor of the primary switch circuit Q1. The voltage across the primary switch circuit declines and its body diode is ON. When the current flowing through the primary switch circuit Q1 reaches the inverse current threshold $V_{IR}$, or when the variation rate of the voltage across the primary switch circuit Q1 reaches the rate threshold $V_{TR}$, the primary switch circuit Q1 is turned on again, and the switching mode power supply enters a new switching cycle. In some of the embodiments, when the current flowing through the primary switch circuit Q1 reaches the inverse current threshold $V_{IR}$ and when the voltage drop of the primary switch circuit Q1 (or the voltage $V_{aug}$ across the third winding T3) reaches the zero reference voltage $V_Z$, or when the variation rate of the voltage across the primary switch circuit Q1 reaches the rate threshold $V_{TR}$, the primary switch circuit Q1 is turned on again, and the switching mode power supply enters a new switching cycle.

Because the charge at the parasitic capacitor of the primary switch circuit Q1 is discharged during the second ON process of the secondary switch circuit 101, and the body diode of the primary switch circuit Q1 is ON before the primary switch circuit Q1's turn-on, several embodiments of the forgoing switching mode power supply realize zero voltage switching on the primary switch circuit Q1.

Figure 12:
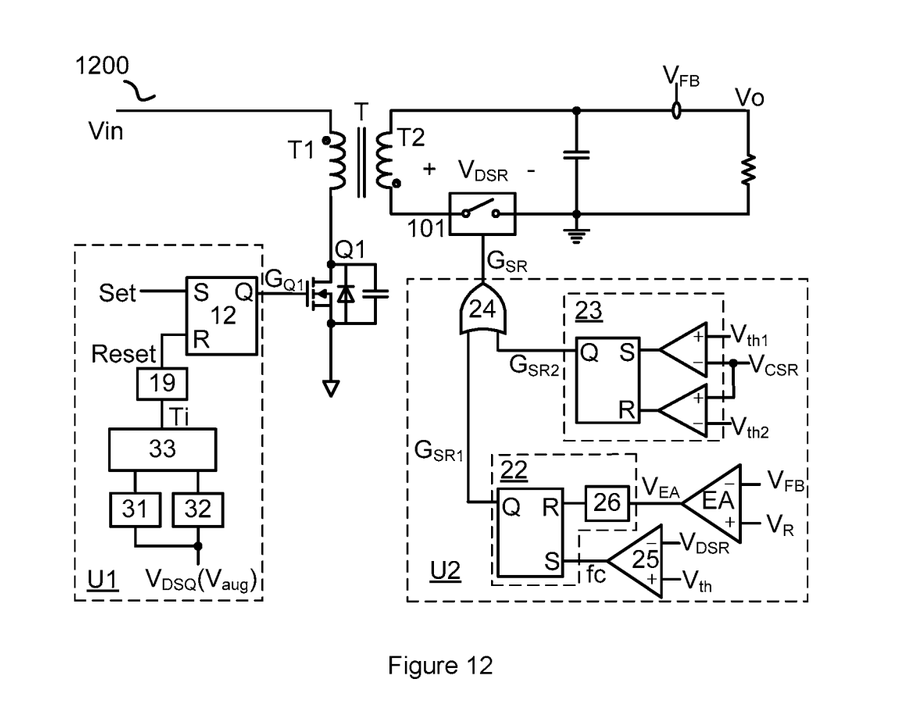
FIG. 12 schematically shows a switching mode power supply 1200 with a detailed circuit configuration of the primary control unit U1 and the secondary control circuit U2 in accordance with an embodiment of the present invention.

FIG. 12 schematically shows a switching mode power supply 1200 with a detailed circuit configuration of the primary control unit U1 and the secondary control circuit U2 in accordance with an embodiment of the present invention. In the example of FIG. 12, the primary control unit U1 comprises: a first edge detector 31, configured to detect a positive jump of a voltage signal indicative of the voltage across the primary switch circuit (e.g., the voltage $V_{DSQ}$ across the primary switch circuit Q1 or the voltage $V_{aug}$ across the third winding T3); a second edge detector 32, configured to detect a negative jump of the voltage signal indicative of the voltage across the primary switch circuit; and a timing circuit 33, configured to start to time in response to the positive jump of the voltage signal indicative of the voltage across the primary switch circuit, and to stop to time in response to the negative jump of the voltage signal indicative of the voltage across the primary switch circuit, to generate a timing signal T1, to control the turn-off of the primary switch circuit Q1.

In one embodiment of the present invention, the primary control circuit U1 further comprises: an off process circuit 19, configured to receive the timing signal T1, to control a turn-off of the primary switch circuit Q1 by controlling its ON time length based on the timing signal T1 (as in FIG. 9), or by controlling the peak current flowing therethrough based on the timing signal T1 (as in FIG. 8).

The secondary control unit U2 further comprises: a valley detector 25, configured to compare the voltage $V_{DSR}$ across the secondary switch circuit 101 with a valley voltage threshold $V_{th}$, to generate the frequency control signal fc; and a time length controller 22, configured to turn on the secondary switch circuit 101 in response to the frequency control signal fc, and to turn off the secondary switch circuit 101 according to the output voltage $V_O$. In one embodiment of the present invention, the output voltage is operable to control the inverse current limit of the secondary switch circuit 101. For example, if 26 comprises a secondary current comparator, when the current flowing through the secondary switch circuit 101 reaches the inverse current limit related to the output voltage $V_O$, the time length controller 22 is reset, to turn off the secondary switch circuit 101. In another embodiment, the output voltage (e.g., the error signal) is operable to control the ON time length of the secondary switch circuit 101. For example, if 26 comprises an ON time length controller, the higher the error signal, the longer the ON time length; and the lower the error signal, the shorter the ON time length. When the ON time length of the secondary switch circuit 101 reaches a value set by the error signal, the ON time length controller is reset, to turn off the secondary switch circuit 101.

Figure 13:
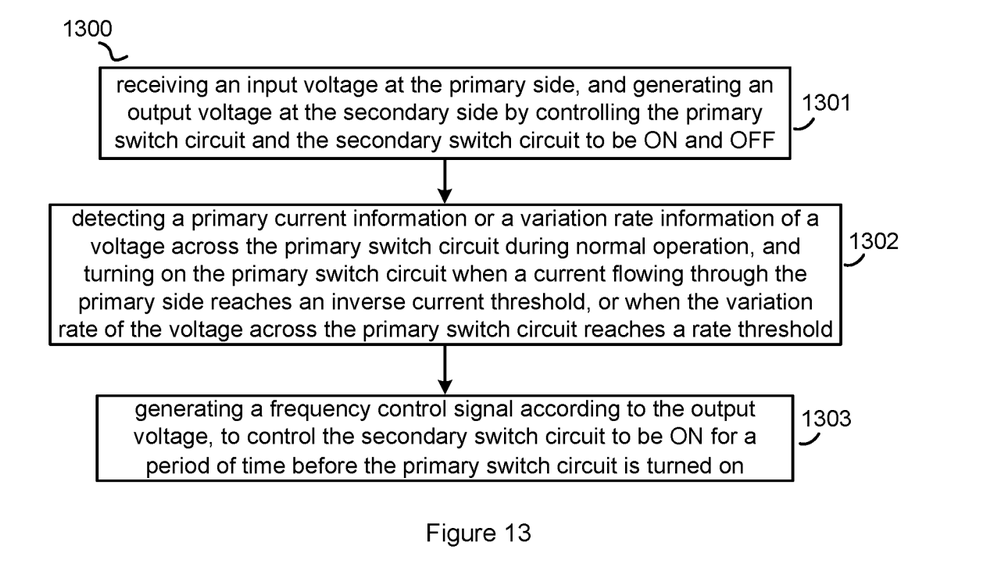
FIG. 13 schematically shows a flowchart 1300 of a method used in a switching mode power supply in accordance with an embodiment of the present invention.

FIG. 13 schematically shows a flowchart 1300 of a method used in a switching mode power supply in accordance with an embodiment of the present invention. The switching mode power supply includes: a primary switch circuit coupled to a primary side of an electrical isolation device, and a secondary switch circuit coupled to a secondary side of the electrical isolation device. The method comprising:

Step 1301, receiving an input voltage at the primary side, and generating an output voltage at the secondary side by controlling the primary switch circuit and the secondary switch circuit to be ON and OFF.

Step 1302, detecting a primary current information or a variation rate information of a voltage across the primary switch circuit, and turning on the primary switch circuit when a current flowing through the primary side reaches an inverse current threshold, or when the variation rate of the voltage across the primary switch circuit reaches a rate threshold. And Step 1303, generating a frequency control signal according to the output voltage, to control the secondary switch circuit to be ON for a period of time before the primary switch circuit is turned on.

In one embodiment of the present invention, the method further comprising: detecting the primary current information and a voltage information across the primary switch circuit in the meantime, and turning on the primary switch circuit when the current flowing through the primary side reaches the inverse current threshold and when the voltage across the primary switch circuit is lower than a zero reference voltage.

In one embodiment of the present invention, the method further comprising: controlling a turn-off of the primary switch circuit in response to a turn-on frequency of the primary switch circuit.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching mode power supply, comprising:
   a primary switch circuit, coupled to a primary side of an electrical isolation device, the primary switch circuit being periodically turned on and off, to deliver an input voltage into a secondary side of the electrical isolation device;
   a secondary switch circuit, coupled to a secondary side of the electrical isolation device, the secondary switch circuit being periodically turned on and off, to provide a desired output voltage;
   a primary control circuit, configured to control the primary switch circuit in response to a current flowing through the primary side or a variation rate of a voltage signal indicative of a voltage across the primary switch circuit, so that: during normal operation, when the current flowing through the primary side reaches an inverse current threshold, or when the variation rate of the voltage signal reaches a rate threshold, the primary switch circuit is turned on; and
   a secondary control circuit, configured to control the secondary switch circuit to be ON for a period of time before the primary switch circuit is turned on.

2. The switching mode power supply of claim 1, wherein during normal operation, the primary switch circuit is turned on
   when the current flowing through the primary side reaches the inverse current threshold and when the voltage across the primary switch circuit is lower than a zero reference voltage; or
   when the variation rate of the voltage signal reaches a rate threshold.

3. The switching mode power supply of claim 1, further comprising a third winding, wherein during normal operation, the primary switch circuit is turned on
   when the current flowing through the primary side reaches the inverse current threshold and when a voltage across the third winding is lower than a zero reference voltage; or
   when the variation rate of the voltage signal reaches a rate threshold.

4. The switching mode power supply of claim 1, wherein the primary control circuit comprises:
   a frequency to voltage converter, configured to generate a compensation signal in response to a turn-on frequency of the primary switch circuit, to turn off the primary switch circuit.

5. The switching mode power supply of claim 4, wherein the frequency to voltage converter comprises:
   a monostable circuit, configured to generate a pulse signal when the primary switch circuit is turned on; and
   a low pass filter, configured to filter the pulse signal to generate the compensation signal.

6. The switching mode power supply of claim 1, wherein the secondary control circuit comprises:
   a frequency generator, configured to generate a frequency control signal according to the output voltage, to turn on the secondary switch circuit; and
   a time length controller, configured to control an ON time length of the secondary switch circuit in response to the frequency control signal.

7. The switching mode power supply of claim 1, the primary control circuit comprises:
   a first edge detector, configured to detect a positive jump of the voltage signal;
   a second edge detector, configured to detect a negative jump of the voltage signal; and
   a timing circuit, configured to start to time in response to the positive jump of the voltage signal, and to stop to time in response to the negative jump of the voltage signal, to control a turn-off of the primary switch circuit.

8. The switching mode power supply of claim 1, further comprising a third winding, wherein the voltage signal comprises a voltage across the third winding.

9. A primary control circuit used in a switching mode power supply, the switching mode power supply including a primary switch circuit coupled to a primary side of an electrical isolation device, and a secondary switch circuit coupled to a secondary side of the electrical isolation device, the primary control circuit comprising:
   a primary logical circuit, configured to turn on the primary switch circuit when a current flowing through the primary side reaches an inverse current threshold, or when a variation rate of a voltage signal indicative of a voltage across the primary switch circuit reaches a rate threshold during normal operation.

10. The primary control circuit of claim 9, wherein the primary logical circuit is further configured to turn on the primary switch circuit:
    when the current flowing through the primary side reaches the inverse current threshold and when the voltage across the primary switch circuit is lower than a zero reference voltage; or
    when the variation rate of the voltage signal reaches a rate threshold.

11. The primary control circuit of claim 9, further comprising:
    a frequency to voltage converter, configured to generate a compensation signal in response to a turn-on frequency of the primary switch circuit, to turn off the primary switch circuit.

12. The primary control circuit of claim 11, wherein the frequency to voltage converter comprises:
    a monostable circuit, configured to generate a pulse signal when the primary switch circuit is turned on; and
    a low pass filter, configured to filter the pulse signal to generate the compensation signal.

13. The primary control circuit of claim 9, further comprising:
    a first edge detector, configured to detect a positive jump of the voltage signal;
    a second edge detector, configured to detect a negative jump of the voltage signal; and
    a timing circuit, configured to start to time in response to the positive jump of the voltage signal, and to stop to time in response to the negative jump of the voltage signal, to control a turn-off of the primary switch circuit.

14. The primary control circuit of claim 9, wherein the switching mode power supply further includes a secondary control circuit, and wherein the secondary control circuit is configured to turn on the secondary switch circuit for a period of time before the primary switch circuit's turn-on.

15. The primary control circuit of claim 14, wherein the secondary control circuit comprises:

a frequency generator, configured to generate a frequency control signal according to an output voltage of the switching mode power supply, to turn on the secondary switch circuit; and a time length controller, configured to control an ON time length of the secondary switch circuit in response to the frequency control signal.

16. The switching mode power supply of claim 9, further comprising a third winding, wherein the voltage signal comprises a voltage across the third winding.

17. A method used in a switching mode power supply, the switching mode power supply including a primary switch circuit coupled to a primary side of an electrical isolation device, and a secondary switch circuit coupled to a secondary side of the electrical isolation device, the method comprising:

receiving an input voltage at the primary side, and generating an output voltage at the secondary side by controlling the primary switch circuit and the secondary switch circuit to be ON and OFF;

detecting a primary current information or a variation rate information of a voltage across the primary switch circuit during normal operation, and turning on the primary switch circuit when a current flowing through the primary side reaches an inverse current threshold, or when the variation rate of the voltage across the primary switch circuit reaches a rate threshold; and generating a frequency control signal according to the output voltage, to control the secondary switch circuit to be ON for a period of time before the primary switch circuit is turned on.

18. The method of claim 17, further comprising:

detecting the primary current information and a voltage information across the primary switch circuit in the meantime; and turning on the primary switch circuit when the current flowing through the primary side reaches the inverse current threshold and when the voltage across the primary switch circuit is lower than a zero reference voltage.

19. The method of claim 17, wherein:

controlling a turn-off of the primary switch circuit in response to a turn-on frequency of the primary switch circuit.

\* \* \* \* \*

UNITED STATES PATENT AND TRADEMARK OFFICE
CERTIFICATE OF CORRECTION

PATENT NO. : 11,621,627 B2  
APPLICATION NO. : 17/237784  
DATED : April 4, 2023  
INVENTOR(S) : Rui et al.

Page 1 of 1

It is certified that error appears in the above-identified patent and that said Letters Patent is hereby corrected as shown below:

On the Title Page

At Item (30) (Foreign Application Priority Data), please insert --Apr. 22, 2020 (CN) 2020103199510--.

Signed and Sealed this  
Twenty-fifth Day of June, 2024

Katherine Kelly Vidal  
*Director of the United States Patent and Trademark Office*